United States Patent
Park et al.

(10) Patent No.: US 12,436,645 B2
(45) Date of Patent: Oct. 7, 2025

(54) TOUCH SENSOR APPARATUS AND DISPLAY APPARATUS INCLUDING THE SAME

(71) Applicant: SAMSUNG DISPLAY CO., LTD., Yongin-si (KR)

(72) Inventors: Sanghun Park, Yongin-si (KR); Youngmin Park, Yongin-si (KR); Yongsub So, Yongin-si (KR); Bo-Hwan Lee, Yongin-si (KR); Hoeung Lee, Yongin-si (KR); Byeongkyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/739,500

(22) Filed: Jun. 11, 2024

(65) Prior Publication Data
US 2025/0117098 A1   Apr. 10, 2025

(30) Foreign Application Priority Data

Oct. 10, 2023   (KR) .......................... 10-2023-0134693

(51) Int. Cl.
*G06F 3/041* (2006.01)
*H03M 1/78* (2006.01)

(52) U.S. Cl.
CPC ........ *G06F 3/0418* (2013.01); *G06F 3/04164* (2019.05); *H03M 1/785* (2013.01)

(58) Field of Classification Search
None
See application file for complete search history.

(56) References Cited

U.S. PATENT DOCUMENTS

| 11,366,558 B2* | 6/2022 | Moy ..................... G06F 3/0445 |
| 11,635,846 B2 | 4/2023 | Park et al. |
| 2013/0257518 A1* | 10/2013 | Hou ..................... H03K 17/962 327/517 |
| 2018/0307368 A1* | 10/2018 | Koide .................... H10D 86/60 |
| 2021/0157467 A1* | 5/2021 | Choi ..................... G06F 3/0443 |
| 2024/0310950 A1* | 9/2024 | Mo ....................... G06F 3/0443 |

* cited by examiner

*Primary Examiner* — Krishna P Neupane
(74) *Attorney, Agent, or Firm* — F. CHAU & ASSOCIATES, LLC

(57) ABSTRACT

A touch sensor apparatus may include a multiplexer including a first transistor connected to a first touch sensor and a second transistor connected to a second touch sensor, a touch driver connected to the first touch sensor through the first transistor and connected to the second touch sensor through the second transistor, the first touch sensor disposed at a first distance from the touch driver and the second touch sensor disposed at a second distance shorter than the first distance from the touch driver. A first on-resistance of the first transistor may be smaller than a second on-resistance of the second transistor.

21 Claims, 9 Drawing Sheets

TOUCH SENSOR APPARATUS AND DISPLAY APPARATUS INCLUDING THE SAME

CROSS-REFERENCE TO RELATED APPLICATION

This application claims priority under 35 USC § 119 to Korean Patent Application No. 10-2023-0134693 filed on Oct. 10, 2023 in the Korean Intellectual Property Office KIPO, the content of which is herein incorporated by reference in its entirety.

BACKGROUND

1. Field

Embodiments of the present inventive concept relate to a touch sensor apparatus and a display apparatus including the same. More particularly, embodiments of the present inventive concept relate to a touch sensor apparatus capable of improving precision and uniformity of sensing voltages, and a display apparatus including the touch sensor.

2. Discussion of the Related Art

Generally, a display apparatus includes a display panel and a display panel driver. The display panel displays an image based on an input image. The display panel includes a plurality of gate lines, a plurality of data lines and a plurality of pixels. The display panel driver may include a gate driver providing gate signals to the gate lines; the data driver providing data voltages to the data lines; and a driving controller controlling the gate driver and the data driver.

The display apparatus may include a touch sensor apparatus. The touch sensor apparatus may include a touch sensor and a touch driver driving the touch sensor. Sensing voltages of the touch sensor may be different according to a distance between the touch sensor and the touch driver. Accordingly, the sensing voltages applied to the touch driver may not be uniform.

SUMMARY

Embodiments of the present inventive concept provide a touch sensor apparatus in which precision and uniformity of sensing signals (voltage or current) applied to a touch driver are improved.

Embodiments of the present inventive concept also provide a display apparatus including the touch sensor apparatus.

In an embodiment of a touch sensor apparatus according to the present inventive concept, the touch sensor apparatus may include a multiplexer including a first transistor connected to a first touch sensor and a second transistor connected to a second touch sensor, a touch driver connected to the first touch sensor through the first transistor and connected to the second touch sensor through the second transistor, the first touch sensor disposed at a first distance from the touch driver and the second touch sensor disposed at a second distance shorter than the first distance from the touch driver. A first on-resistance of the first transistor may be less than a second on-resistance of the second transistor.

In various options:

A first control voltage may be applied to a control electrode of the first transistor. A second, different control voltage may be applied to a control electrode of the second transistor.

The first and second transistors may be P-type transistors. The first control voltage may be higher (in absolute value) than that of the second control voltage.

The first and second transistors may be N-type transistors. The first control voltage may be higher than the second control voltage.

The touch driver may include a digital to analog converter (DAC) configured to generate the first control voltage and the second control voltage. The DAC may include a first power voltage terminal receiving a first power voltage, a second power voltage terminal receiving a second power voltage, a plurality of converter resistors connected between the first power voltage terminal and the second power voltage terminal and a plurality of converter switches connected to the first power voltage terminal, the second power voltage terminal and nodes between the first converter resistors.

The first and second transistors may be P-type transistors. The first power voltage may be higher than the second power voltage. The DAC may generate divided voltages by using the first and second power voltages. The DAC is configured to output a first divided voltage as the first control voltage and a second, different divided voltage as the second control voltage.

The first and second transistors may be N-type transistors. The first power voltage may be higher than the second power voltage. The DAC may generate divided voltages by using the first and second power voltages. The DAC is configured to output a first divided voltage as the first control voltage and a second, different divided voltage as the second control voltage.

The touch sensor apparatus may further include a fourth touch sensor disposed at the first distance from the touch driver and a fifth touch sensor disposed at the second distance from the touch driver. The multiplexer may further include a fourth transistor connected to the fourth touch sensor and a fifth transistor connected to the fifth touch sensor. The fourth transistor may have the first on-resistance and the fifth transistor has the second on-resistance.

A first control voltage may be applied to a control electrode of the first transistor and a control electrode of the fourth transistor. A second control voltage may be applied to a control electrode of the second transistor and a control electrode of the fifth transistor. The first control voltage and the second voltage may be different from each other.

The touch sensor apparatus may further include a third touch sensor disposed at a third distance shorter than the second distance from the touch driver. The multiplexer may further include a third transistor connected to the third touch sensor. A third on-resistance of the third transistor may be greater than the second on-resistance.

The touch driver may include a sensing circuit. The sensing circuit may include an amplifier including a first input terminal receiving a reference voltage, a second input terminal receiving a sensing voltage and an output terminal, a sensing resistor connected between the second input terminal and the output terminal, a sensing switch connected between the second input terminal and the output terminal and a sensing capacitor connected between the second input terminal and the output terminal.

The first on-resistance may be less than the second on-resistance in a sensing period in which the sensing voltage may be applied to the touch driver.

The touch driver may apply a driving signal to the first touch sensor and the second touch sensor through the multiplexer. The touch driver may receive a sensing voltage of the first touch sensor and a sensing voltage of the second touch sensor through the multiplexer.

In an embodiment of a display apparatus according to the present inventive concept, a display apparatus may include a display panel including a pixel, a display panel driver driving the display panel. A multiplexer including a first transistor connected to a first touch sensor and a second transistor connected to a second touch sensor, a touch driver connected to the first touch sensor through the first transistor and connected to the second touch sensor through the second transistor, the first touch sensor disposed at a first distance from the touch driver and the second touch sensor disposed at a second distance shorter than the first distance from the touch driver. A first on-resistance of the first transistor may be less than a second on-resistance of the second transistor.

In an embodiment, a touch sensor apparatus includes: a multiplexer including a first transistor connected to a first touch sensor and a second transistor connected to a second touch sensor; and a touch driver configured to apply a first control signal to the first transistor to operate the first transistor with a first on-resistance, and to apply a second control signal to the second transistor to operate the second transistor with a second on-resistance greater than the first on-resistance. The first and second touch sensors are disposed at first and second distances from the touch driver, respectively, where the second distance is shorter than the first distance.

Accordingly, in embodiments of the touch sensor apparatus and the display apparatus summarized above, the transistors included in the multiplexer may have an on-resistance based on the distance. The touch driver may receive the sensing data (e.g., sensing voltage or current) based on the distance from the touch sensors. Accordingly, precision and uniformity of the sensing data may be improved, which may improve the touch performance of the display panel even when the external environment (e.g., temperature of the display panel, etc.) changes.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF EMBODIMENTS

Hereinafter, the present inventive concept will be described in more detail with reference to the accompanying drawings.

Figure 1A:
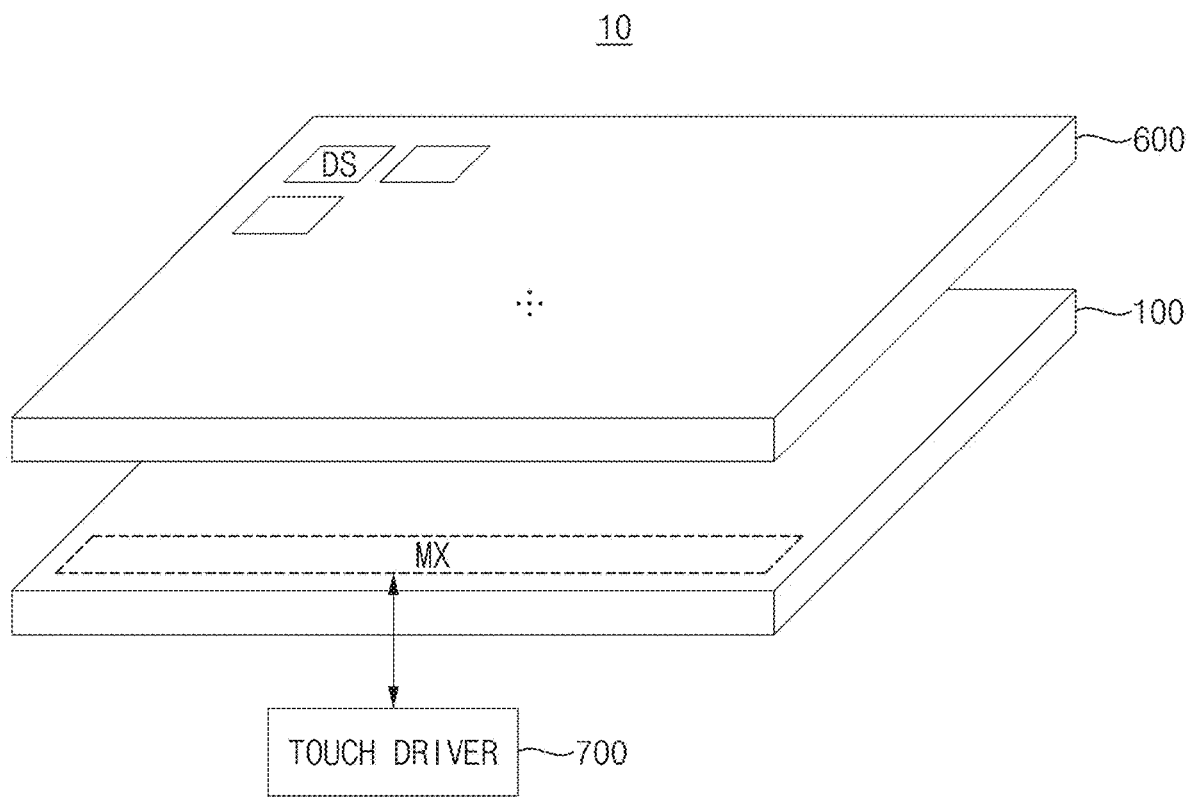
FIG. 1A is a block diagram illustrating a display apparatus according to an embodiment of the present inventive concept.
Figure 1B:
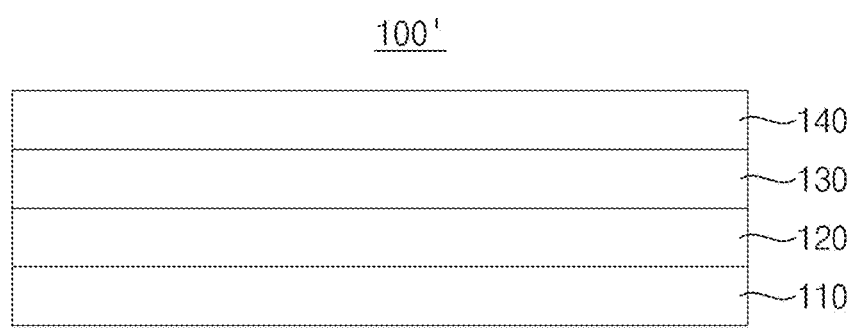
FIG. 1B is a conceptual cross-sectional view illustrating a display panel according to an embodiment of the present inventive concept.
Figure 1C:
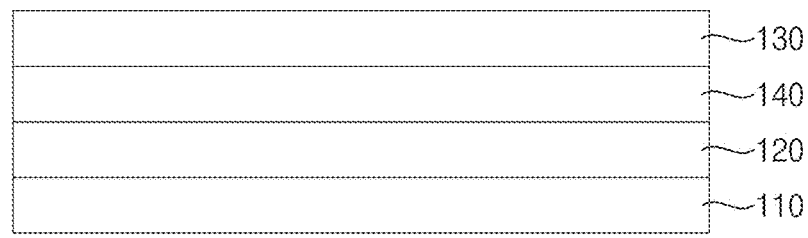
FIG. 1C is a conceptual cross-sectional view illustrating a display panel according to an embodiment of the present inventive concept.
Figure 2:
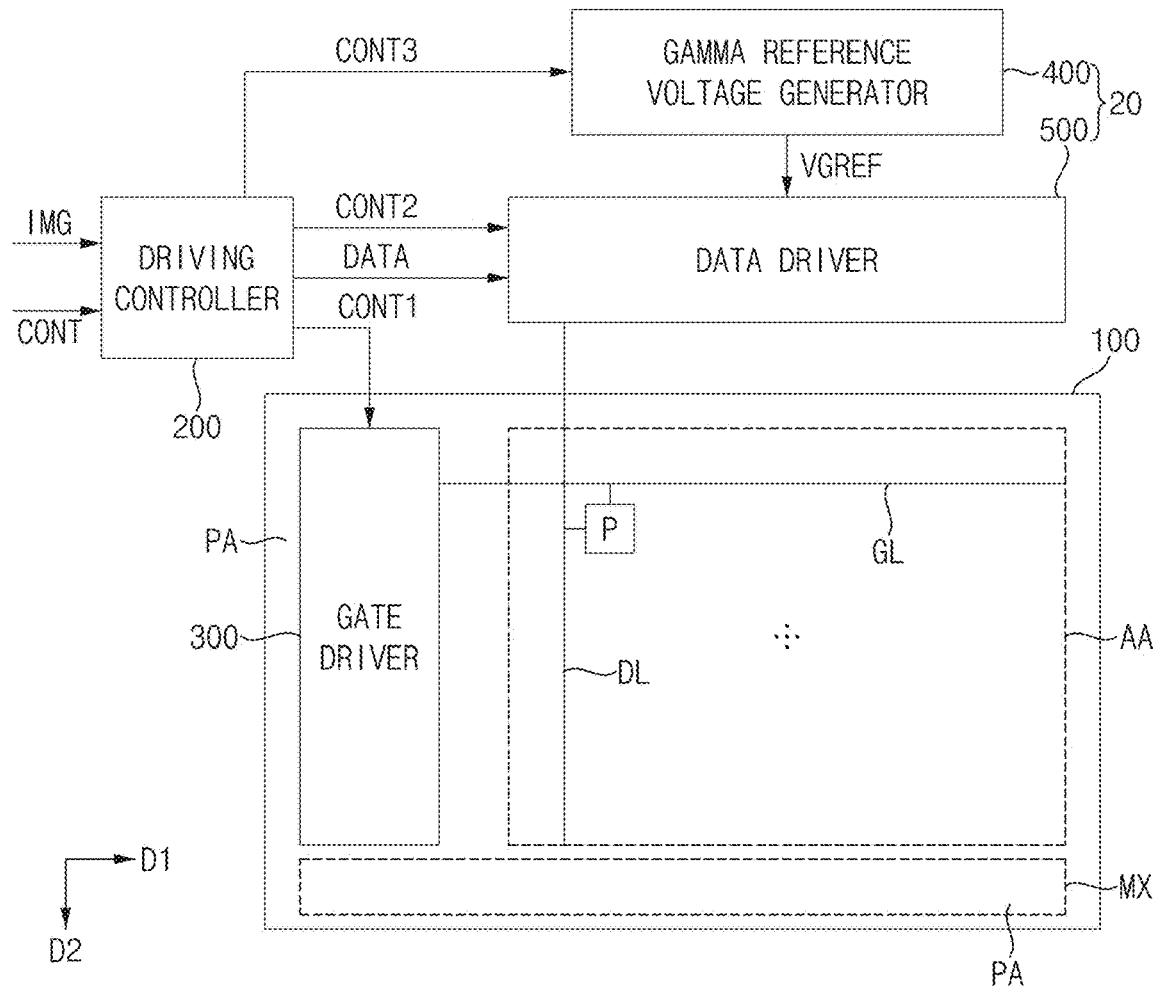
FIG. 2 is a block diagram illustrating a display panel, a driving controller, a gate driver, a gamma reference voltage generator, a data driver and a multiplexer of a display apparatus of the display apparatus of FIG. 1A.

FIG. 1A is a block diagram illustrating a display apparatus, 10, according to an embodiment of the present inventive concept. FIG. 1B is a conceptual cross-sectional view illustrating a display panel according to an embodiment of the present inventive concept. FIG. 1C is a conceptual cross-sectional view illustrating a display panel according to another embodiment of the present inventive concept. FIG. 2 is a block diagram illustrating a display panel, a driving controller, a gate driver, a gamma reference voltage generator, a data driver and a multiplexer of a display apparatus of the display apparatus of FIG. 1A.

Referring to FIGS. 1A to 2, the display apparatus includes a display panel 100, a display panel driver 20 driving the display panel 100, a touch panel 600 disposed on the display panel 100 and a touch driver 700 driving the touch panel 600.

The touch panel 600 includes a touch sensor DS. For example, the touch sensor DS may be a self dot sensor, e.g., a mutual capacitance touch sensor for a touch screen, where "dot" stands for direct on-cell touch, and "on-cell" is a process in which a touch panel is embedded between a polarizer and a color filter substrate. When the self dot sensor is used as the touch sensor DS, a wider panel bandwidth may be realized, and the influence of noise on the display panel 100 may be reduced. When the display apparatus 10 is an automotive display apparatus, implementation of the touch sensor DS as the self dot sensor may be advantageous. The automotive display apparatus has a long resolution in one direction, so that to implement the touch sensor DS in a line form may be difficult. The long resolution in one direction may mean that the display panel may include more pixels in one direction than another direction. When the touch sensor DS is implemented in the line form in the automotive display apparatus, signal delay may increase, the panel bandwidth may not be sufficiently wide and noise influence on the display panel 100 may increase.

In the example of FIG. 1A, the touch panel 600 may be disposed externally of the display panel 100. Alternatively, the touch panel and the display panel may be integrally formed.

Referring to FIG. 1B, the display panel 100' (an example vertical structure of display panel 100) may include a base substrate 110, a display layer 120 disposed on the base substrate 110, an encapsulation layer 130 disposed on the display layer 120 and a touch layer 140 disposed on the encapsulation layer 130. The display layer 120 may include a light emitting element. The touch layer 140 may include a touch sensor DS.

Referring to FIG. 1C, the display panel 100″ (another example vertical structure of display panel 100) may include a base substrate 110, a display layer 120 disposed on the base substrate 110, a touch layer 140 disposed on the display layer 120 and an encapsulation layer 130 disposed on the touch layer 140. The display layer 120 may include a light emitting element. The touch layer 140 may include a touch sensor DS.

A plurality of touch sensors DS may be connected to a multiplexer MX. To drive the touch sensors DS in a time division driving (TDD) method, the multiplexer MX may select each touch sensor DS at a different respective time. The multiplexer MX may include a plurality of transistors connected to the plurality of touch sensors DS.

For example, the multiplexer MX (and the transistors thereof) may be disposed in a peripheral region PA of the display panel 100. The transistors may be integrated on the peripheral region PA of the display panel 100. When the transistors are integrated on the peripheral region PA of the display panel 100, drawbacks of mounting pads may be overcome.

The touch driver 700 may apply a touch driving signal to a transistor of the multiplexer MX. The touch driver 700 may receive a sensed voltage of the touch sensor DS through the transistor. A period in which the sensing data (e.g., sensing voltage or current) is applied/detected to the touch driver 700 may be called a sensing period.

The display panel driver 20 may include a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called a timing controller embedded data driver (TED).

The display panel 100 has a display region AA on which an image is displayed and the peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the gate lines GL may be arranged spaced apart from each other in a second direction D2 crossing the first direction D1. The data lines DL may extend in the second direction D2 and the data lines DL may be arranged spaced apart from each other in the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal, a data enable signal, a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates and outputs gate signals driving the gate lines GL in response to the first control signal CONT1 received from the driving controller 200. The gate driver 300 may sequentially output the gate signals to the gate lines GL. The gate driver 300 may be mounted on the peripheral region PA of the display panel 100. The gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

The gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

Figure 3:
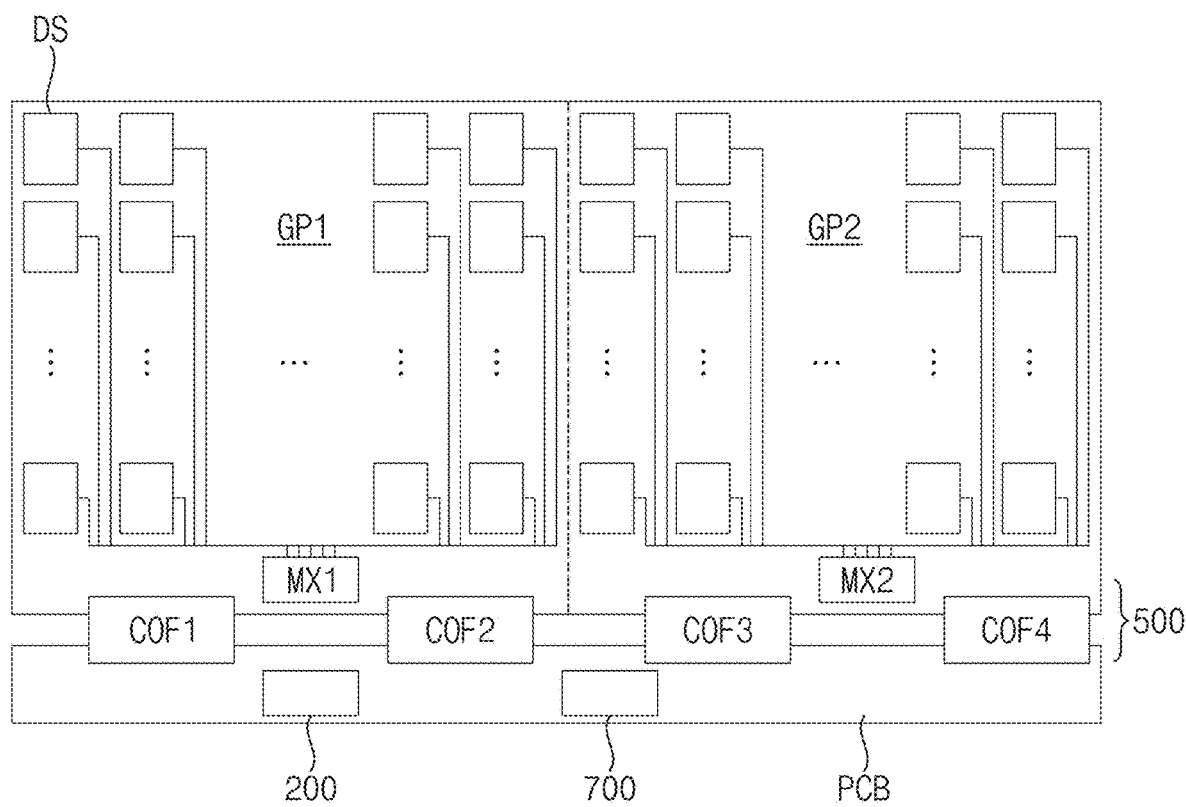
FIG. 3 is a conceptual diagram illustrating the display apparatus of FIG. 1A.

FIG. 3 is a conceptual diagram illustrating the display apparatus of FIG. 1A.

Referring to FIGS. 1A to 3, the multiplexer MX may include first and second multiplexers MX1 and MX2, respectively. A first group GP1 of touch sensors DS in the touch panel 600 may be connected to the first multiplexer MX1 and a second group GP2 of touch sensors DS in the touch panel 600 may be connected to the second multiplexer MX2.

The driving controller 200 and the touch driver 700 may be disposed on a printed circuit board PCB.

The touch driver 700 may be connected to the first multiplexer MX1 and the second multiplexer MX2; output the touch driving signal to the touch sensors DS; and receive the sensed voltage from the touch sensor DS. Although the touch driver 700 includes two multiplexers MX1 and MX2 in FIG. 3, other embodiments may have only a single multiplexer, or at least three multiplexers.

As shown in FIG. 3, the data driver 500 may be formed with a chip on film (COF) construction. For example, a first chip on film unit COF1 may output the data voltage to a first area of the display panel 100, a second chip on film unit COF2 may output the data voltage to a second area of the display panel 100, a third chip on film unit COF3 may output the data voltage to a third area of the display panel 100 and a fourth chip on film unit COF4 may output the data voltage to a fourth area of the display panel 100.

Figure 4:
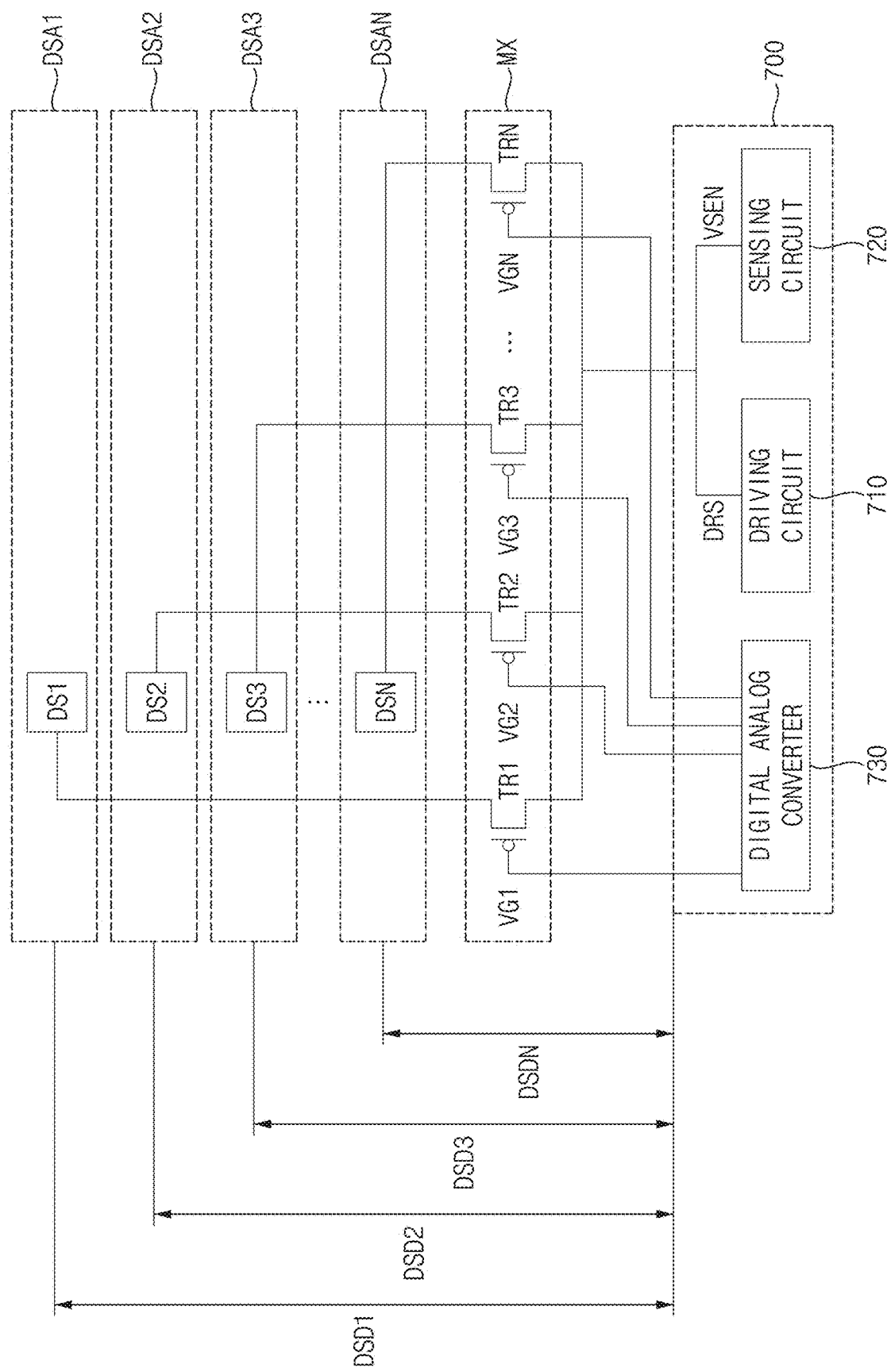
FIG. 4 is a circuit/functional diagram illustrating a touch driver, a multiplexer and a plurality of touch sensors of FIG. 3.

FIG. 4 is a circuit/functional block diagram illustrating a touch driver, a multiplexer and a plurality of touch sensors of FIG. 3.

Referring to FIG. 4, the touch driver 700 may include a driving circuit 710, a sensing circuit 720 and digital to analog converter (DAC) 730. The multiplexer MX may be connected to the driving circuit 710, the sensing circuit 720 and the DAC 730. Additionally, the multiplexer MX may be connected to the touch sensors DS1 to DSN. The multiplexer may include a first transistor TR1 receiving a first control voltage VG1, a second transistor TR2 receiving a second control voltage, a third transistor TR3 receiving a third control voltage VG3 to an Nth transistor TRN receiving an Nth control voltage VGN, where N is positive integer. The first transistor TR1 may be connected to a first touch sensor DS1, the second transistor TR2 may be connected to a second touch sensor DS2, the third transistor TR3 may be connected to a third touch sensor DS3 and the Nth transistor TRN may be connected to an Nth touch sensor DSN.

The first control voltage VG1, the second control voltage VG2 and the third control voltage VG3 to the Nth control voltage VGN may be different in some embodiments. In other embodiments, some of the control voltages among VG1 to VGN may be the same and others may differ from one another.

The first touch sensor DS1 may be disposed in a first area DSA1. The first area DSA1 may be disposed at a first distance DSD1 from the touch driver 700. The second touch sensor DS2 may be disposed in a second area DSA2, which is disposed at a second distance DSD2 from the touch driver 700. The second distance DSD2 may be shorter than the first distance DSD1. The third touch sensor DS3 may be disposed in a third area DSA3, which is disposed at a third distance DSD3 from the touch driver 700. The third distance DSD3 may be shorter than the second distance DSD2. The Nth touch sensor DSN may disposed in a Nth area DSAN, which is disposed at a Nth distance DSDN from the touch driver 700. The Nth distance DSDN may be shorter than the third distance DSD3.

The first control voltage VG1, the second control voltage VG2 and the third control voltage VG3 to the Nth control voltage may differ from one another, so that a first on-resistance of the first transistor TR1, a second on-resistance of the second transistor TR2 and a third on-resistance of the third transistor T3 to an Nth on-resistance of the Nth transistor TRN may be different.

Generally, an on-resistance of a transistor may refer to a resistance when the transistor is biased to have a turned-on state.

In the example of FIG. 4, the first on-resistance may be less than the second on-resistance. The second on-resistance may be less than the third on-resistance. The third on-resistance may be less than the Nth on-resistance. This is because, when the absolute value of the control voltage (gate-to-source voltage) VGi (i=1 to N) is relatively high, this generates a higher drain-to-source current, and correspondingly the on-resistance of the transistor is relatively low. Setting the control voltages VG and the on-resistances in this manner may compensate for higher wiring loss between the multiplexer MX and the more distant touch sensors DS, e.g., in the area DSA1, as compared to the closer touch sensors DS, e.g., in the area DSAN.

In a conventional touch sensor apparatus, the same control voltage may be applied to the conventional multiplexer regardless of the distance from the conventional touch driver. Accordingly, the precision of sensing data (e.g., sensing voltage or current) of the conventional touch sensor apparatus may be inaccurate. This is because there may be higher wiring loss for touch sensors that are relatively far away from the multiplexer. Due to the higher wiring loss, the same touch effect, e.g., change in capacitance during a touch event, at a touch sensor further away produces less of a detectable change in the sensing data signal (current or voltage) at the receiving side. In contrast, the touch driver 700 according to the present inventive concept may apply a different control voltage to the multiplexer MX according to the distance between the touch sensor DSi (i=1 to N) in the corresponding area DSAi connected to the touch driver 700. Accordingly, the transistors TR1, TR2, TR3 to TRN included in the multiplexer MX may have an on-resistance based on the distance. For example, when the distance between the touch sensor DS and the touch driver 700 is long, the on-resistance may be relatively small. Conversely, when the distance between the touch sensor DS and the touch driver 700 is short, the on-resistance may be relatively high. Accordingly, the touch driver 700 may receive the sensing data (e.g., sensing voltage) at a level based on the distance from the touch sensors DS1 to DSN. Accordingly, the precision and uniformity of the sensing data may be improved. As a result, the touch performance of the display panel may be improved even when the external environment (e.g., temperature of the display panel, etc.) changes.

Figure 5:
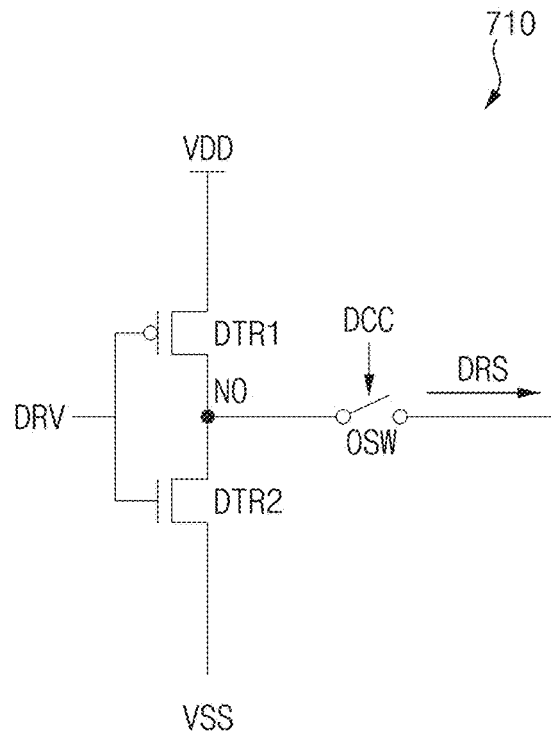
FIG. 5 is a circuit diagram illustrating a driving circuit of FIG. 4.
Figure 6:
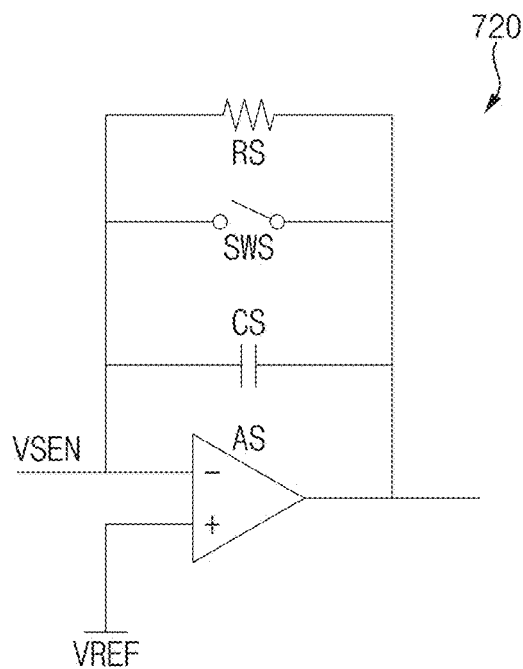
FIG. 6 is a circuit diagram illustrating a sensing circuit of FIG. 4.
Figure 7:
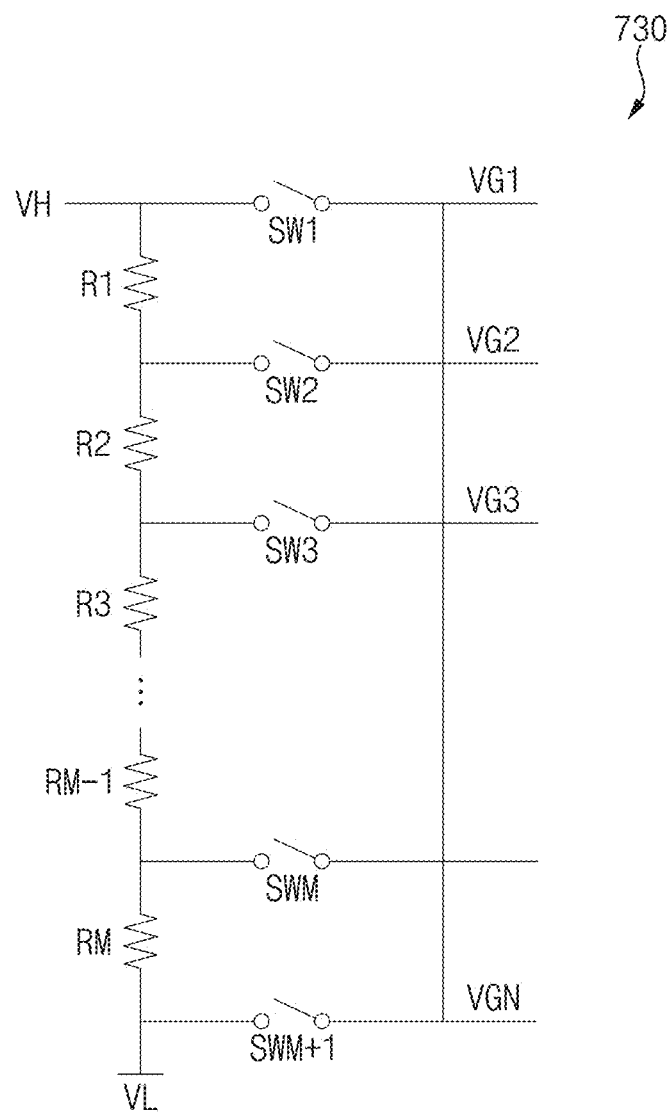
FIG. 7 is a circuit diagram illustrating a digital analog converter of FIG. 4.

FIG. 5 is a circuit diagram illustrating an example driving circuit of FIG. 4. FIG. 6 is a circuit diagram illustrating an example sensing circuit of FIG. 4. FIG. 7 is a circuit diagram illustrating an example digital to analog converter (DAC) of FIG. 4.

Referring to FIG. 4 to FIG. 7, the driving circuit 710 may output a driving signal to the multiplexer MX in response to a driving control signal DRV. For example, the driving circuit 710 may include a first driving transistor DTR1, a second driving transistor DTR2 and driving output switching element OSW.

The first driving transistor DTR1 may include a control electrode (e.g., a gate electrode) receiving the driving control signal DRV, a first electrode (e.g., a drain electrode) receiving a high power voltage VDD and a second electrode (e.g., a source electrode) connected to a driving signal output node NO. The second transistor DTR2 may include a control electrode receiving the driving control signal DRV, a first electrode connected to the driving signal output node NO and a second electrode receiving a low power voltage VSS. The driving output switching element OSW may include a first terminal connected to the driving signal output node NO and a second terminal connected to the multiplexer MX. The driving output switching element OSW may output the driving signal DRS in response to a driving circuit control signal DCC. The driving signal DRS may be a voltage of the driving signal output node NO. However, the present inventive concept is not limited to the structure of the driving circuit 710.

For example, the sensing circuit 720 may include an amplifier AS including a first input terminal receiving a reference voltage VREF, a second input terminal, an output terminal, a sensing resistor RS connected between the second input terminal and the output terminal, a sensing switch connected to the second input terminal and the output terminal and a sensing capacitor CS connected to the second input terminal and the output terminal.

The sensing resistor RS, the sensing switch SWS and the sensing capacitor CS may be connected in parallel between the second input terminal and the output terminal.

The sensing circuit 720 may receive, at the second input terminal, the sensing voltage VSEN of the touch sensors DS1 to DSN through the multiplexer MX. It is noted here that other sensing circuit structures may be substituted for that of the sensing circuit 720 of FIG. 7 in other embodiments.

As shown in FIG. 7, the DAC 730 may include a high power voltage terminal receiving a first power voltage VH having a high level, a low power voltage terminal receiving a second power voltage VL having a low level, and a resistor string with resistors R1, R2, R3, . . . , RM−1, RM (where in general, M is two or more, and (M+1) may equal "N" of FIG. 4) connected between the high power voltage terminal and the low power voltage terminal. The DAC 730 may further include a switch SW1 connected to the high power voltage terminal, a switch SWM+1 connected to the low power voltage terminal and a plurality of switches SW2, SW3, . . . , SWM connected between resistors of the resistor string R1, R2, R3, . . . , RM−1 and RM. The DAC 730 may output a first divided voltage to an Nth divided voltage between a power voltage having the high level and a power voltage having the low level in response to a turned-on state of the switches SW1, SW2, SW3, . . . , SWM. The first divided voltage to the Nth divided voltage may be the control voltage (e.g., VG1, VG2, VG3, . . . , VGN). For example, the first divided voltage may be the first control voltage VG1; the second divided voltage may be the second control voltage VG2; the third divided voltage may be the third control voltage VG3; and the Nth divided voltage may be the Nth control voltage VGN.

Figure 8:
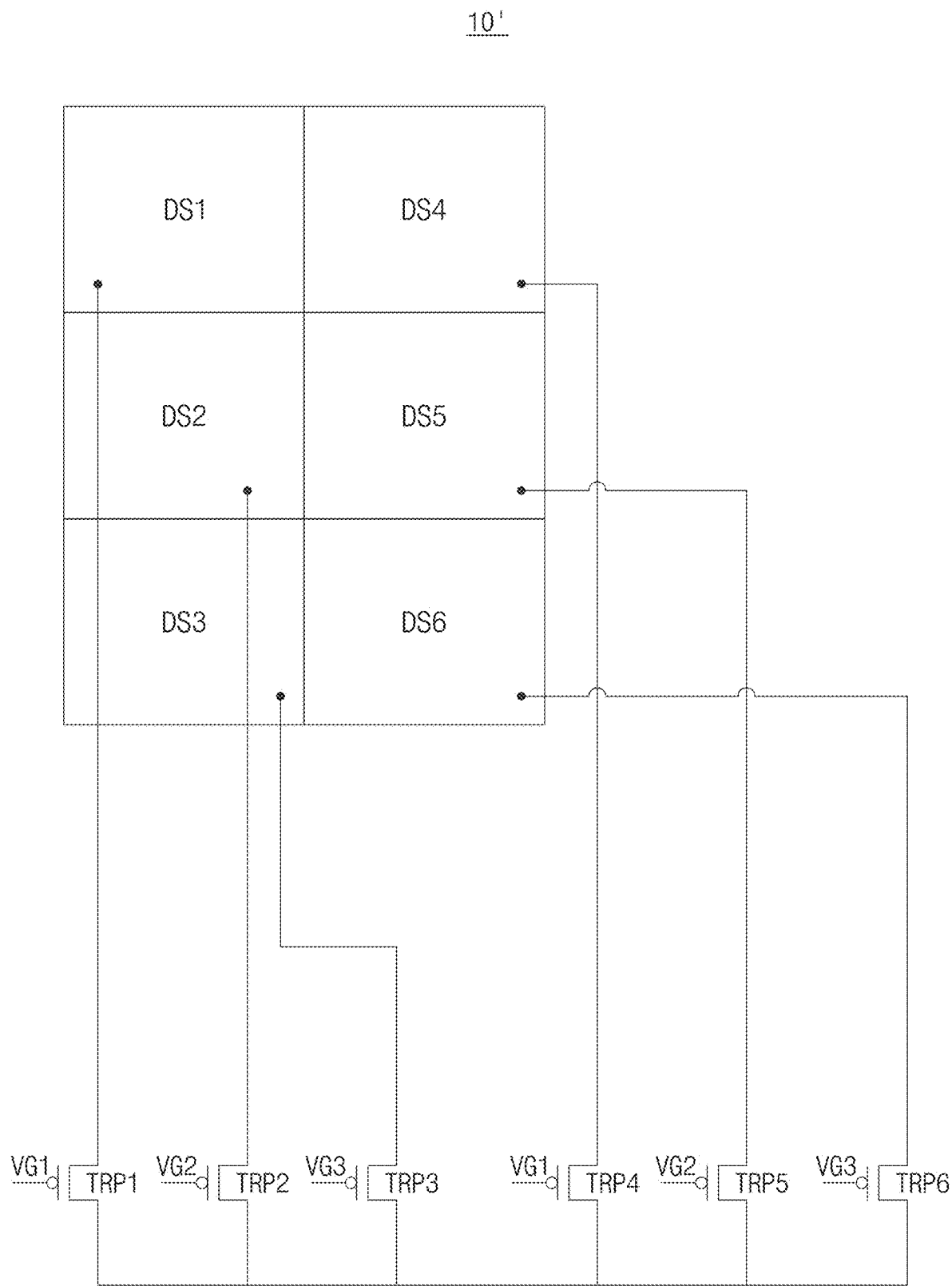
FIG. 8 is a circuit diagram illustrating a part of a touch sensor apparatus of FIG. 1A.

FIG. 8 is a circuit diagram illustrating a part of a touch sensor apparatus, 10', which is an embodiment of the touch sensor apparatus 10 of FIG. 1A.

FIG. 8 illustrates six touch sensors DS1 to DS6 for convenience of explanation. In FIG. 8, the first control voltage VG1 is applied to a first touch sensor DS1 and a fourth touch sensor DS4, the second control voltage VG2 is applied to a second touch sensor DS2 and a fifth touch sensor DS5 and the third control voltage VG3 is applied to a third touch sensor DS3 and a sixth touch sensor DS6.

Referring to FIG. 4 and FIG. 8, the touch sensor apparatus 10' may include first to sixth touch sensors DS1 to DS6 and first to sixth transistors TRP1 to TRP6 corresponding to and connected to the first to sixth touch sensors DS1 to DS6. The first touch sensor DS1 and the fourth touch sensor DS4 may be disposed in the first area DSA1 and may be approximately equidistant from the multiplexer MX. The second touch sensor DS2 and the fifth touch sensor DS5 may be disposed in the second area DSA2. The third touch sensor DS1 and the sixth touch sensor DS6 may be disposed in the third area DSA3 and may be approximately equidistant from the multiplexer MX. The first control voltage VG1 may be applied to a control electrode of the first transistor TRP1 and a control electrode of the fourth transistor TRP4. The second control voltage VG2 may be applied to a control electrode of the second transistor TRP2 and a control electrode of the fifth transistor TRP5. The third control voltage VG3 may be applied to a control electrode of the third transistor TRP3 and a control electrode of the sixth transistor TRP6.

In the embodiment of FIG. 8, the first to the sixth transistors TRP1 to TRP6 may be P-type transistors (the circle at the gates of transistors TRP1 to TRP6 is indicative of "P-type"), so that an inactivation level of the first control voltage VG1, the second control voltage VG2 and the third control voltage VG3 may be a high level (e.g., zero volts or a positive gate-to-source voltage). Additionally, in the present embodiment, the absolute value of the first control voltage VG1 may be higher than that of the second control voltage VG2. (When the first and second control voltages VG1 and VG2 are both negative, the first control voltage VG1 may be more negative than the second control voltage VG2 and therefore have a higher absolute value of voltage.) The absolute value of the second control voltage VG2 may be higher than that of the third control voltage VG3. The first control voltage VG1 may be applied to a control electrode of the transistors (e.g., the first transistor TRP1 and the fourth transistor TRP4) connected to the touch sensors (e.g., the first touch sensor DS1 and the fourth touch sensor DS4) disposed in the first area DSA1. Accordingly, the transistors (e.g., the first transistor TRP1 and the fourth transistor TRP4) connected to the touch sensors (e.g., the first touch sensor DS1 and the fourth touch sensor DS4) disposed in the first area DSA1 may have the first on-resistance.

Additionally, the second control voltage VG2 may be applied to a control electrode of the transistors (e.g., the second transistor TRP2 and the fifth transistor TRP5) connected to the touch sensors (e.g., the second touch sensor DS2 and the fifth touch sensor DS5) disposed in the second area DSA2. Accordingly, the transistors (e.g., the second transistor TRP2 and the fifth transistor TRP5) connected to the touch sensors (e.g., the second touch sensor DS2 and the fifth touch sensor DS5) disposed in the second area DSA2 may have the second on-resistance.

Additionally, the third control voltage VG3 may be applied to a control electrode of the transistors (e.g., the third transistor TRP3 and the sixth transistor TRP6) connected to the touch sensors (e.g., the third touch sensor DS3 and the sixth touch sensor DS6) disposed in the third area DSA3. The absolute value of the third control voltage VG3 may be lower than that of the first control voltage VG1 the second control voltage VG2. Accordingly, the transistors (e.g., the third transistor TRP3 and the sixth transistor TRP6) connected to the touch sensors (e.g., the third touch sensor DS3 and the sixth touch sensor DS6) disposed in the third area DSA3 may have the third on-resistance. In the present embodiment, the first on-resistance may be lower than the second on-resistance, the second on-resistance may be lower than the third on-resistance, so that uniformity and precision of the sensing voltage VSEN may be improved, as explained above.

The connection relationship between the touch sensors and the transistors shown in FIG. 8 is an example and the present inventive concept is not limited to the connection relationship between the touch sensors and the transistors shown in FIG. 8.

Figure 9:
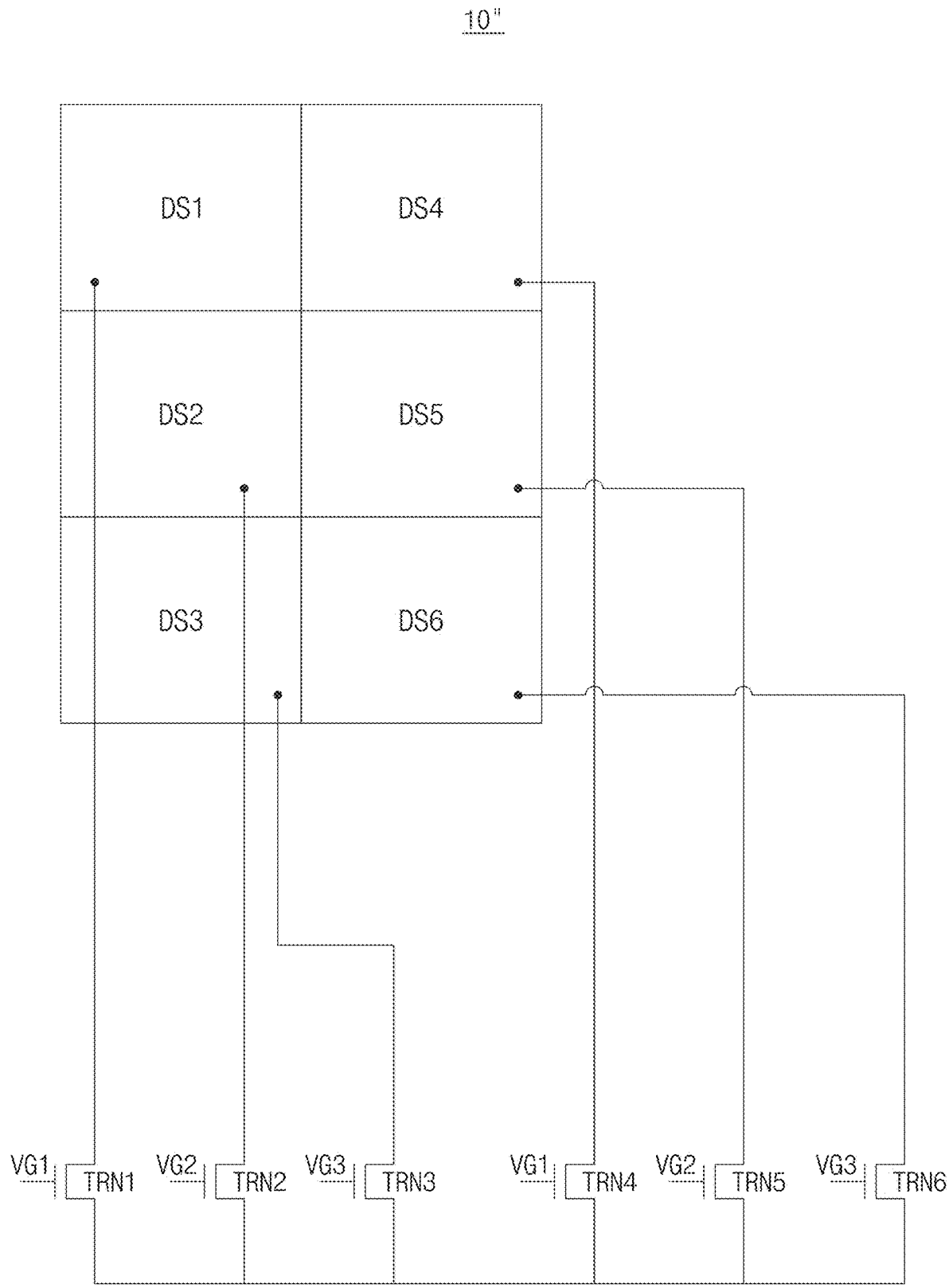
FIG. 9 is a circuit diagram illustrating a part of a touch sensor apparatus of FIG. 1A.

FIG. 9 is a circuit diagram illustrating a part of a touch sensor apparatus, 10", which is another embodiment of the touch sensor apparatus 10 of FIG. 1A.

Referring to FIG. 4 and FIG. 9, the touch sensor apparatus may include first to sixth touch sensors DS1 to DS6 and first to sixth transistors TRN1 to TRN6 corresponding to and connected to the first to sixth touch sensors DS1 to DS6. The first touch sensor DS1 and the fourth touch sensor DS4 may be disposed in the first area DSA1. The second touch sensor DS2 and the fifth touch sensor DS5 may be disposed in the second area DSA2. The third touch sensor DS1 and the sixth touch sensor DS6 may be disposed in the third area DSA3. The first control voltage VG1 may be applied to a control electrode of the first transistor TRN1 and a control electrode of the fourth transistor TRN4. The second control voltage VG2 may be applied to a control electrode of the second transistor TRN2 and a control electrode of the fifth transistor TRN5. The third control voltage VG3 may be applied to a control electrode of the third transistor TRN3 and a control electrode of the sixth transistor TRN6.

Figure 10:
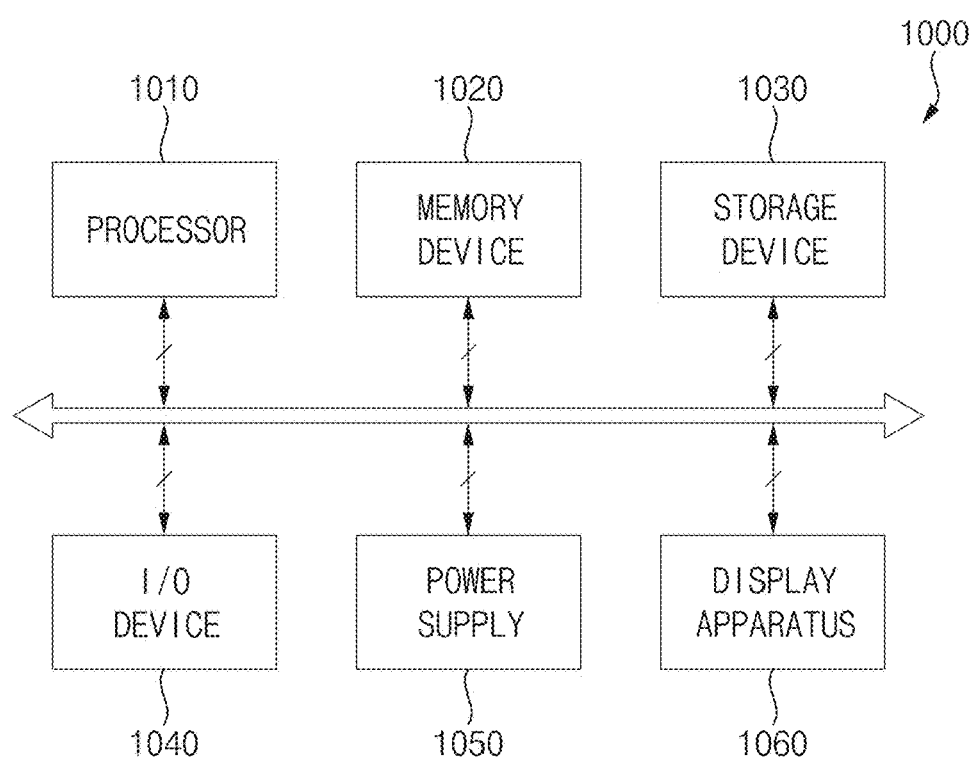
FIG. 10 is a block diagram illustrating an electronic apparatus according to an embodiment of the present inventive concept.

In the embodiment of FIG. 10, the first to the sixth transistors TRN1 to TRN6 may be N-type transistor (indicated by the absence of a circle at the transistor gates), so that an inactivation level of the first control voltage VG1, the second control voltage VG2 and the third control voltage VG3 may be a low level (e.g., gate-to-source voltage of zero volts). Additionally, in the present embodiment of FIG. 10, the first control voltage VG1 may be higher than the second control voltage VG2. The second control voltage VG2 may be higher than the third control voltage VG3. The first control voltage VG1 may be applied to a control electrode of the transistors (e.g., the first transistor TRN1 and the fourth transistor TRN4) connected to the touch sensors (e.g., the first touch sensor DS1 and the fourth touch sensor DS4) disposed in the first area DSA1. Accordingly, the transistors (e.g., the first transistor TRN1 and the fourth transistor TRN4) connected to the touch sensors (e.g., the first touch sensor DS1 and the fourth touch sensor DS4) disposed in the first area DSA1 may have the first on-resistance.

Additionally, the second control voltage VG2 may be applied to a control electrode of the transistors (e.g., the second transistor TRN2 and the fifth transistor TRN5) connected to the touch sensors (e.g., the second touch sensor DS2 and the fifth touch sensor DS5) disposed in the second area DSA2. The second control voltage VG2 may be lower than the first control voltage VG1. The second control voltage VG2 may be higher than the third control voltage VG3. Accordingly, the transistors (e.g., the second transistor TRN2 and the fifth transistor TRN5) connected to the touch sensors (e.g., the second touch sensor DS2 and the fifth touch sensor DS5) disposed in the second area DSA2 may have the second on-resistance.

Additionally, the third control voltage VG3 may be applied to a control electrode of the transistors (e.g., the third transistor TRN3 and the sixth transistor TRN6) connected to the touch sensors (e.g., the third touch sensor DS3 and the sixth touch sensor DS6) disposed in the third area DSA3. Accordingly, the transistors (e.g., the third transistor TRN3 and the sixth transistor TRN6) connected to the touch sensors (e.g., the third touch sensor DS3 and the sixth touch sensor DS6) disposed in the third area DSA3 may have the third on-resistance. In the present embodiment, the first on-resistance may be lower than the second on-resistance, the second on-resistance may be lower than the third on-resistance, so that uniformity and precision of the sensing voltage VSEN may be improved.

The connection relationship between the touch sensors and the transistors shown in FIG. 9 is an example and the present inventive concept is not limited to the connection relationship between the touch sensors and the transistors shown in FIG. 9.

Figure 11:
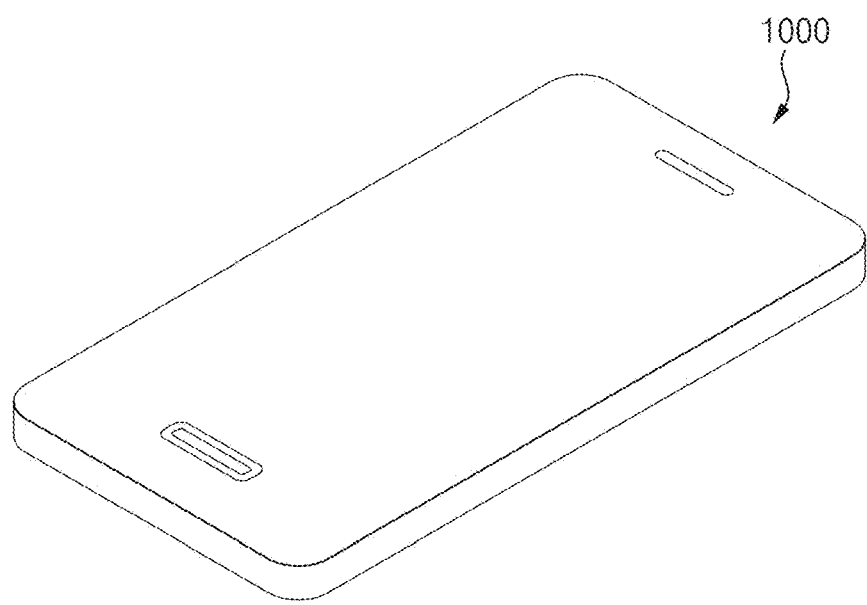
FIG. 11 is a diagram illustrating an example in which the electronic apparatus of FIG. 10 is implemented as a smart phone.

FIG. 10 is a block diagram illustrating an electronic apparatus according to an embodiment of the present inventive concept. FIG. 11 is a view illustrating an example in which the electronic apparatus of FIG. 10 is implemented as a smart phone.

Referring to FIG. 10 and FIG. 11, the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1A. In addition, the electronic apparatus 1000 may further include a plurality of ports for communicating with a video card, a sound card, a memory card, a universal serial bus (USB) device, other electronic apparatuses, etc.

According to an embodiment, as shown in FIG. 11, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device and the like.

The processor 1010 may perform various computing functions or various tasks. The processor 1010 may be a micro-processor, a central processing unit (CPU), an application processor (AP) and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device and the like and/or at least one volatile memory device such as a dynamic random access memory (DRAM) device, a static random access memory (SRAM) device, a mobile DRAM device and the like.

Examples of the storage device 1030 may include a solid state drive (SSD) device, a hard disk drive (HDD) device, a CD-ROM device and the like. Examples of the I/O device 1040 may include an input device such as a keyboard, a keypad, a mouse device, a touch-pad, a touch-screen and the like and an output device such as a printer, a speaker and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the touch sensor apparatus and display apparatus including the same described above, the touch driver may apply different control voltages to the multiplexer according to the respective distances between the touch sensors (connected to the multiplexer) and the touch driver.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, any means-plus-function clauses are intended to cover the structures described herein as performing the recited function, as well as equivalent structures. Therefore, it is to be understood that the foregoing is illustrative of the present inventive concept and is not to be construed as limited to the specific embodiments disclosed and that modifications to the disclosed embodiments, as well as other embodiments, are intended to be included within the scope of the appended claims and their equivalents.

What is claimed is:

1. A touch sensor apparatus comprising:
a multiplexer including a first transistor connected to a first touch sensor and a second transistor connected to a second touch sensor;
a touch driver connected to the first touch sensor through the first transistor, and connected to the second touch sensor through the second transistor;
wherein,
the first touch sensor is disposed at a first distance from the touch driver,
the second touch sensor is disposed at a second distance shorter than the first distance from the touch driver, and a first on-resistance of the first transistor is less than a second on-resistance of the second transistor,
wherein the touch driver applies a first control voltage based on the first distance to the first transistor and applies a second other control voltage based on the second distance to the second transistor.

2. The touch sensor apparatus of claim 1, wherein:
the touch driver applies the first control voltage to a control electrode of the first transistor,
the touch driver applies the second control voltage to a control electrode of the second transistor.

3. The touch sensor apparatus of claim 2, wherein the first transistor and the second transistor are P-type transistors, and
an absolute value of the first control voltage is higher than an absolute value of the second control voltage.

4. The touch sensor apparatus of claim 2, wherein the first transistor and the second transistor are N-type transistors, and
the first control voltage is higher than the second control voltage.

5. The touch sensor apparatus of claim 2, wherein the touch driver includes a digital to analog converter (DAC) configured to generate the first control voltage and the second control voltage,
wherein the DAC includes:
a first power voltage terminal receiving a first power voltage;
a second power voltage terminal receiving a second power voltage;
a plurality of converter resistors connected between the first power voltage terminal and the second power voltage terminal; and
a plurality of converter switches connected to the first power voltage terminal, the second power voltage terminal, and nodes between the first converter resistors.

6. The touch sensor apparatus of claim 5, wherein the first transistor and the second transistor are P-type transistors, wherein:
the first power voltage is higher than the second power voltage,
the DAC generates divided voltages by using the first power voltage and the second power voltage, and the DAC is configured to output a first divided voltage as the first control voltage, and to output a second divided voltage different from the first divided voltage as the second control voltage.

7. The touch sensor apparatus of claim 5, wherein:
the first transistor and the second transistor are N-type transistors,
the first power voltage is higher than the second power voltage,
the DAC generates divided voltages by using the first power voltage and the second power voltage, and
the DAC is configured to output a first divided voltage as the first control voltage, and to output a second divided voltage different from the first divided voltage as the second control voltage.

8. The touch sensor apparatus of claim 1, further comprising a third touch sensor disposed at a third distance shorter than the second distance from the touch driver,
wherein the multiplexer further includes a third transistor connected to the third touch sensor, and
wherein a third on-resistance of the third transistor is greater than the second on-resistance.

9. The touch sensor apparatus of claim 1, further comprising a fourth touch sensor disposed at the first distance from the touch driver and a fifth touch sensor disposed at the second distance from the touch driver,
wherein the multiplexer further includes a fourth transistor connected to the fourth touch sensor and a fifth transistor connected to the fifth touch sensor and
wherein the fourth transistor has the first on-resistance and the fifth transistor has the second on-resistance.

10. The touch sensor apparatus of claim 9, wherein:
a first control voltage is applied to a control electrode of the first transistor and a control electrode of the fourth transistor,
a second control voltage is applied to a control electrode of the second transistor and a control electrode of the fifth transistor, and
the first control voltage and the second voltage are different from each other.

11. The touch sensor apparatus of claim 1, wherein the touch driver includes a sensing circuit,
wherein the sensing circuit includes:
an amplifier including a first input terminal receiving a reference voltage, a second input terminal receiving a sensing voltage, and an output terminal;
a sensing resistor connected between the second input terminal and the output terminal;
a sensing switch connected between the second input terminal and the output terminal; and
a sensing capacitor connected between the second input terminal and the output terminal.

12. The touch sensor apparatus of claim 11, wherein the first on-resistance is less than the second on-resistance in a sensing period in which the sensing voltage is applied to the touch driver.

13. The touch sensor apparatus of claim 1, wherein the touch driver applies a driving signal to the first touch sensor and the second touch sensor through the multiplexer, and
wherein the touch driver receives a sensing voltage of the first touch sensor and a sensing voltage of the second touch sensor through the multiplexer.

14. A display apparatus comprising:
a display panel including a plurality of pixels;
a display panel driver driving the display panel;
a multiplexer including a first transistor connected to a first touch sensor and a second transistor connected to a second touch sensor;
a touch driver connected to the first touch sensor through the first transistor, and connected to the second touch sensor through the second transistor,
wherein,
the first touch sensor is disposed at a first distance from the touch driver; and
the second touch sensor is disposed at a second distance shorter than the first distance from the touch driver, and a first on-resistance of the first transistor is less than a second on-resistance of the second transistor,
wherein the touch driver applies a first control voltage based on the first distance to the first transistor and applies a second other control voltage based on the second distance to the second transistor.

15. The display apparatus of claim 14, wherein the first control voltage is applied to a control electrode of the first transistor,
wherein the second control voltage is applied to a control electrode of the second transistor.

16. The display apparatus of claim 15, wherein the first transistor and the second transistor are P-type transistors, and
wherein an absolute value of the first control voltage is higher than an absolute value of the second control voltage.

17. The display apparatus of claim 15, wherein the first transistor and the second transistor are N-type transistors and
wherein the first control voltage is higher than the second control voltage.

18. The display apparatus of claim 14, further comprising a third touch sensor disposed at a third distance shorter than the second distance from the touch driver,
wherein the multiplexer further includes a third transistor connected to the third touch sensor, and
wherein a third on-resistance of the third transistor is greater than the second on-resistance.

19. The display apparatus of claim 18, wherein:
a first control voltage is applied to a control electrode of the first transistor,
a second control voltage is applied to a control electrode of the second transistor,
a third control voltage is applied to a control electrode of the third transistor, and
the first control voltage, the second voltage and the third voltage are different from one another.

20. The display apparatus of claim 14, further comprising a fourth touch sensor disposed at the first distance from the touch driver and a fifth touch sensor disposed at the second distance from the touch driver,
wherein the multiplexer further includes a fourth transistor connected to the fourth touch sensor and a fifth transistor connected to the fifth touch sensor, and
wherein the fourth transistor has the first on-resistance and the fifth transistor bas the second on-resistance.

21. A touch sensor apparatus comprising:
a multiplexer including a first transistor connected to a first touch sensor and a second transistor connected to a second touch sensor,
a touch driver configured to apply a first control signal to the first transistor to operate the first transistor with a first on-resistance, and to apply a second control signal to the second transistor to operate the second transistor with a second on-resistance greater than the first on-resistance,
wherein the first control signal is based on a first distance between the touch driver and the first touch sensor and the second control signal is based on a second distance between the touch driver and the second touch sensor, wherein the second distance is shorter than the first distance.

* * * * *